Feb. 11, 1969  H. BARDONG  3,426,549

AIR CONDITIONING INSTALLATION FOR MOTOR VEHICLES

Filed July 28, 1967

INVENTOR.
HELMUT BARDONG
BY
AGT.

United States Patent Office 3,426,549
Patented Feb. 11, 1969

3,426,549
AIR CONDITIONING INSTALLATION FOR
MOTOR VEHICLES
Helmut Bardong, Stuttgart-Feuerbach, Germany, assignor
to Fa. Suddeutsche Kuhlerfabrik Julius Fr. Behr,
Stuttgart-Feuerbach, Germany
Filed July 28, 1967, Ser. No. 656,764
Claims priority, application Germany, July 29, 1966,
S 105,101
U.S. Cl. 62—244                                  2 Claims
Int. Cl. B60h 3/04

ABSTRACT OF THE DISCLOSURE

Air conditioning system for automobile, including auxiliary condensers mounted externally of the motor.

Background of the invention

Figure 1:
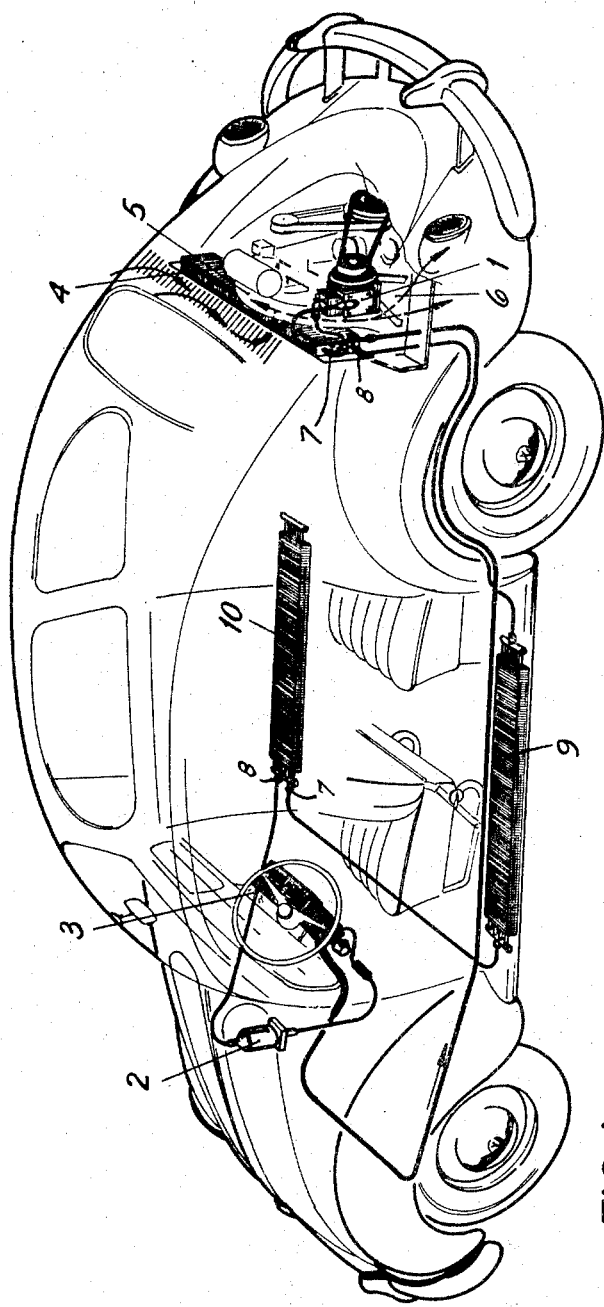

The invention relates generally to air conditioning systems. More in particular, the invention concerns an air conditioning system for cooling the inner space of a motor vehicle. An air conditioning system of this type conventionally comprises a compressor that is driven by the combustion engine of the vehicle, an evaporator accommodated in the interior of the vehicle, a condensation device or unit, as well as the associated control devices and the conduits connecting the individual components. Air conditioning systems of this type are known where a condenser with a cooler is connected ahead of the combustion engine and is subjected to forced air from the cooling blower of the cooling installation.

Air conditioning systems for motor vehicles of this type have shortcomings in that the condenser that is associated with the cooling blower of such an installation must be of large size as far as the cooling surface area is concerned. As the cooling air passes through this condenser, a considerable heat increase of this cooling air is inevitable. This, however, involves the consequence that the temperature drop that is available in the cooler for carrying off the lost heat of the internal combustion engine is correspondingly decreased.

It is one object of the invention to avoid these shortcomings in an air conditioning system for cooling the inner space of motor vehicles.

Accordingly, the invention provides in the first place that for the condenser system one or more auxiliary condensers are connected behind the condenser which is coordinated with the cooling blower of the internal combustion engine. The basic concept of the invention is therefore considered to reside in that in an air conditioning system of this type for the cooling of the inner space of motor vehicles, not a sole condenser is provided which is associated with the cooling blower, but the total required surface of the condenser installation is sub-divided into at least two or several condensers. Thus, in addition to the cooling blower condenser, one or several further additional or auxiliary condensers are to be provided.

An arrangement of this type provides the considerable advantage that the cooling blower condenser requires a correspondingly smaller space because it occupies a considerably smaller surface as compared to the state of the art. In addition there is the advantage that due to the smaller output which is to be expected from this cooling blower condenser, there results also a correspondingly lower ventilator driving power. The entire construction expense for the cooling blower condenser, for the cooling blower or fan and also in what concerns the ribbing of the cylinder in air-cooled combustion engines is reduced or simplified.

Preferably, the arrangement of this air conditioning system in accordance with the invention is made in a manner that the auxiliary condenser, or condensers, can be provided externally of the inner space of the vehicle. For this purpose one should first consider providing these auxiliary condensers on the lower side of the bottom pan, or of the running boards of the vehicle. If these additional condensers are arranged, for example, below the bottom pan or the running boards of the vehicle, then they do not affect the desired unobstructed surface area at the bottom of the vehicle. The auxiliary condensers are rather in the hollow space that is available at any rate, and which is open towards the bottom. This means, that the drive wind or breeze that passes externally of the vehicle or at the bottom side of the vehicle is relied on for cooling these auxiliary condensers, which is an effect that cannot be attained when the total condenser performance must be obtained from a single condenser, which in accordance with the state of the art is arranged under the hood.

If, in accordance with the invention, this sub-division of the condenser surface into a cooling blower condenser and one or more auxiliary condensers is undertaken, then the cooling surface for the cooling blower condenser may, in accordance with a further feature of the invention be so arranged that the temperature of the air picked up by the cooling blower is not essentially increased. Particularly this effect constitutes a considerable progress with respect to the state of the art with the advantageous side effects that have already been mentioned above.

Finally, a further object of the invention provides for the cooling agent to flow through the condenser of the cooling blower in a hair pin tube or conduit system, through the first auxiliary condenser in a conduit system without return or reverse, and through the second auxiliary condenser in a hair pin conduit system. With such an arrangement there results a relatively simple conduit system for the entire air conditioning installation. It is also accomplished in this manner that all of the cooling agent flows through all conduits of the system. This results in a corresponding amount of flow of the coolant or cooling agent through the entire conduit system, whereby the intended amount of heat exchange is correspondingly increased.

Description of the invention

Figure 2:
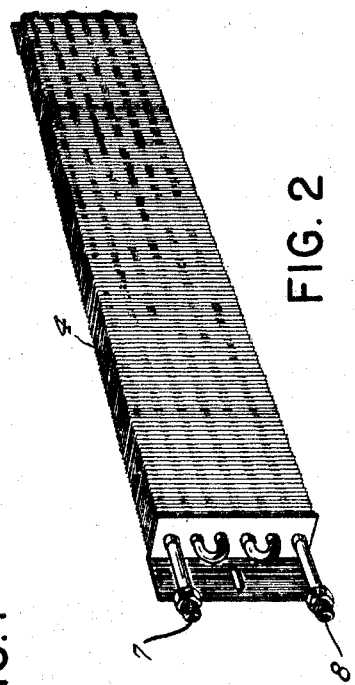

Further objects and advantages of the invention will become apparent from the following description of an embodiment of the invention in an air conditioning system as illustrated in the accompanying drawings, in which FIG. 1 is a perspective view of the invention as installed in a motor vehicle, and FIG. 2 is a perspective view of a condenser with a hair pin conduit system.

The coolant or cooling agent is conducted by means of the compressor 1 out of the coolant container 2 into the vaporizer 3 which is located inside the vehicle. From there the coolant vaporized in this vaporizer 3 moves to the compressor in the direction of the arrow. The compressed coolant vapor then reaches the cooling blower condenser 4 which is disposed before the cooling blower 5. As indicated by arrows in the drawing, the cooling air then moves first through the cooling blower condenser 4 and is then conducted to the combustion engine 6 by way of the cooling blower 5.

The coolant passes through the cooling blower condenser 4 by way of a hair pin conduit system. The entrance 7 and the outlet or exit 8 of the coolant in the cooling blower condenser are therefore at the same transverse surface of this cooling blower condenser 4. Thus the coolant can be conducted directly to the first auxiliary condenser 9 as it leaves the cooling blower condenser while it flows through this first auxiliary condenser without being reversed. The coolant is then conducted from the exit end of the first auxiliary condenser 9 to the second auxiliary condenser 10 which is likewise equipped with a hair pin conduit system through inlet 7. The discharge or exit end 8 for the coolant at the second auxiliary condenser 10 is then connected in turn with the coolant container.

Having now described my invention with reference to the embodiment illustrated in the drawing I do not wish to be limited thereto, but what I desire to protect by Letters Patent of the United States is set forth in the appended claims.

I claim:

1. Air conditioning system for cooling the interior of motor vehicles comprising a compressor driven by the engine of the vehicle, a coolant container, a vaporizer disposed in the interior of the vehicle intermediate said compressor and said coolant container, a condenser system, conduits connecting said components and control devices for said components, said condenser system including a main condenser associated with the cooling blower of said engine in a known manner and a pair of auxiliary condensers connected in series with said main condenser, each disposed below a running board of the vehicle, and at least one said condenser having a hair pin conduit system.

2. Air conditioning system in accordance with claim 1, including two auxiliary condensers, where said main condenser has a hair pin conduit system, the first auxiliary condenser has a non-reversing conduit system and the second auxiliary condenser has a hair pin conduit system.

References Cited

UNITED STATES PATENTS

| | | | |
|---|---|---|---|
| 2,774,220 | 12/1956 | Heym | 62—244 |
| 2,895,310 | 7/1959 | Benisch | 62—239 |
| 2,989,854 | 6/1961 | Gould | 62—244 |
| 3,087,312 | 4/1963 | White | 62—244 |
| 3,091,943 | 6/1963 | Plegat | 62—243 |

WILLIAM J. WYE, *Primary Examiner.*

U.S. Cl. X.R.

62—239, 61